United States Patent [19]

Tanaka et al.

[11] 4,040,664
[45] Aug. 9, 1977

[54] HARNESS ANCHORING FOR CHILD SAFETY SEAT

[75] Inventors: Akira Tanaka, Northridge; Charles J. Ulrich, Montecito, both of Calif.

[73] Assignee: American Safety Equipment Corporation, Encino, Calif.

[21] Appl. No.: 740,308

[22] Filed: Nov. 9, 1976

Related U.S. Application Data

[63] Continuation of Ser. No. 608,657, Aug. 28, 1975.

[51] Int. Cl.² ............................................. A62B 35/00
[52] U.S. Cl. ..................................... 297/389; 297/216
[58] Field of Search ............... 297/377, 384, 385, 389, 297/216, 250, 254, 255, DIG. 2, 458, 460, 232

[56] References Cited

U.S. PATENT DOCUMENTS

| 3,325,213 | 6/1967 | Levy | 297/250 X |
| 3,596,986 | 8/1971 | Ragsdale | 297/DIG. 2 |
| 3,709,558 | 1/1973 | Jakob | 297/250 |
| 3,791,694 | 2/1974 | Roberts | 297/389 |
| 3,858,936 | 1/1975 | Gerkin | 297/DIG. 2 |
| 3,910,634 | 10/1975 | Morris | 297/384 |
| 3,938,859 | 2/1976 | Henderson | 297/385 |

Primary Examiner—James T. McCall
Attorney, Agent, or Firm—Poms, Smith, Lande & Glenny

[57] ABSTRACT

A child safety seat is generally formed of one piece molded material having slots through the back wall of the seat. The harness for securing the child in the seat passes through slots in the seat and is anchored to the rear of the seat at selected vertical locations. The harness is connected to a hook plate having a hook thereon and the anchoring means on the rear of the seat includes a plurality of vertically spaced openings for receiving the hook at selected vertical positions. Means are provided in the receiving opening in the rear of the seat to prevent insertion or removal of the hook except when the hook is in a particular orientation with respect to the receiving opening.

10 Claims, 8 Drawing Figures

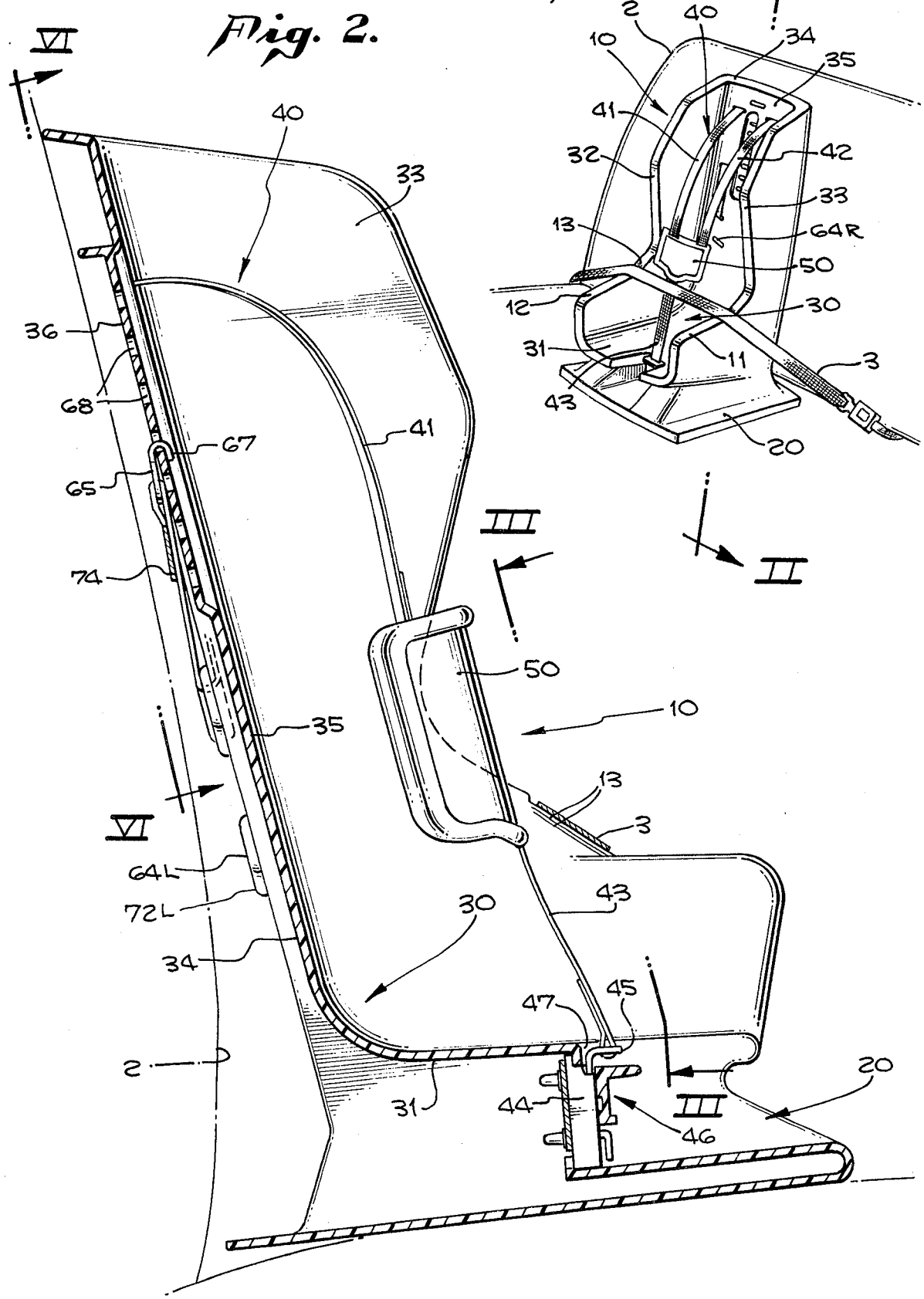

HARNESS ANCHORING FOR CHILD SAFETY SEAT

BACKGROUND OF THE INVENTION

This is a continuation of application Ser. No. 608,657, filed Aug. 28, 1975.

This disclosure relates generally to that of Tanaka and Kuszynski, Ser. No. 608,656, filed Aug. 28, 1975, entitled "CHILD SAFETY SEAT WITH IMPROVED ABDOMINAL PAD ADJUSTMENT AND BUCKLE SECURING MEANS."

Although more sophisticated child safety seats are being developed to ensure the safety of the child occupant, a number of significant problems remain to be solved. One such problem is to provide for adjustability of the harness holding the child within the seat. Various means have been proposed to provide for such adjustment. For example, in an application entitled "CHILD SAFETY SEAT," to Armstrong, Ser. No. 414,192, filed Nov. 9, 1973 and now abandoned, the harness section extending from the abdominal pad was adjusted by means of a simple strap tightener. The system left the free end of the webbing to dangle in front of the child where the child could become entangled. Moreover, the excess webbing was not neat and projected an unattractive appearance.

To overcome some of these problems, an application entitled "ABDOMINAL RESTRAINT AND BELT STORAGE MEANS FOR CHILD SAFETY SEATS FOR VEHICLES," Ser. No. 472,079, filed May 22, 1974 to Tanaka, proposed stowing the free end of the webbing within the abdominal pad. However, the storage of the webbing within the pad created some problems, among which was the increased cost for the tightening and storing system within the pad. These difficulties are set forth in somewhat greater length in copending application Ser. No. 608,656, supra. Therefore, it is an object of the present invention to overcome the problems associated with the free end of the webbing interfering with the child and creating a harnes which is not neat. A further object is to overcome the problems associated with having adjusting and storing means for the free end of the webbing inside the abdominal pad.

A further problem of the prior art is that strap tighteners have a tendency to allow small amounts of slippage. After prolonged use, it may be possible that the harness would not be properly adjusted to secure the child within the seat. In such a situation, if a crash occurred, the chance of injury to the child would be increased. Therefore, it is another object of the invention to overcome this problem by eliminating strap tighteners from the child safety seat as much as possible.

The most effective protection available to a child is afforded by a one piece seat that generally surrounds the child. The sides prevent lateral movement and the rear of the seat supports the child's back, neck and head. Such seats are not new, as shown in a U.S. Pat. to Roberts et al, No. 3,791,694. One problem with such seats was that of anchoring the harness to the child safety seat. In U.S. Pat. No. 3,791,694, the harness is permanently attached to a plate secured to the rear of the seat. In application Ser. No. 414,192, supra, the harness is connected to a tube surrounding the child safety seat. Therefore, it is a further object of the present invention to eliminate the necessity for a plate or supporting tube while maintaining a secure anchor for the harness. It must be remembered that it is advantageous to construct the child safety seat out of lightweight materials such as plastic and the addition of any metal parts increases the weight and the cost of the child safety seat. Weight reduction is an important factor because the child safety seat is useful as an auxiliary seat outside of a vehicle and will often be removed from the vehicle for that purpose. However, because a plastic shell is usually not as strong as a metal one, the harness anchor must be designed to be strong enough to effectively anchor the harness during the severest crash.

Another object of the invention is to ensure that the child cannot affect adjustment of the harness either purposely or accidentally.

Other objects will become evident from the description of the invention.

SUMMARY OF THE INVENTION

The child safety seat of the present invention has front and rear sides and a harness for maintaining the child against the front side. The child safety seat has been improved by adding slots for passage of part of the harness from the front side to the rear side of the seat and providing anchoring means on the rear side of the seat for anchoring the harness at selected vertical locations on the rear side of the seat. The harness may include a hook and the anchoring means includes a plurality of vertically spaced receiving openings receiving the hook at selected vertical positions for adjusting the harness. The receiving opening and the hook are so designed that insertion or removal of the hook from the receiving openings is prevented except when the hook is in a particular insertion orientation with respect to the receiving openings. There may be a plurality of slots for passage of the webbing to better absorb the energy from the harness by the seat. The vertically spaced openings for receiving the hook may be located between sets of the slots through which the webbing passes, one set of slots for each shoulder webbing section, and the lower slots may be at an angle with respect to the upper slots for angling the webbing section toward the plurality of receiving openings after they pass through the angled slots.

BRIEF DESCRIPTION OF THE DRAWINGS

FIG. 1 is a perspective view of the child safety seat embodying the improvement of the present invention.

FIG. 2 is a sectional view taken through the plane II—II in FIG. 1 and shows in slightly more detail the anchoring of the webbing to the rear of the seat.

DETAILED DESCRIPTION OF THE PREFERRED EMBODIMENT

Figure 3:
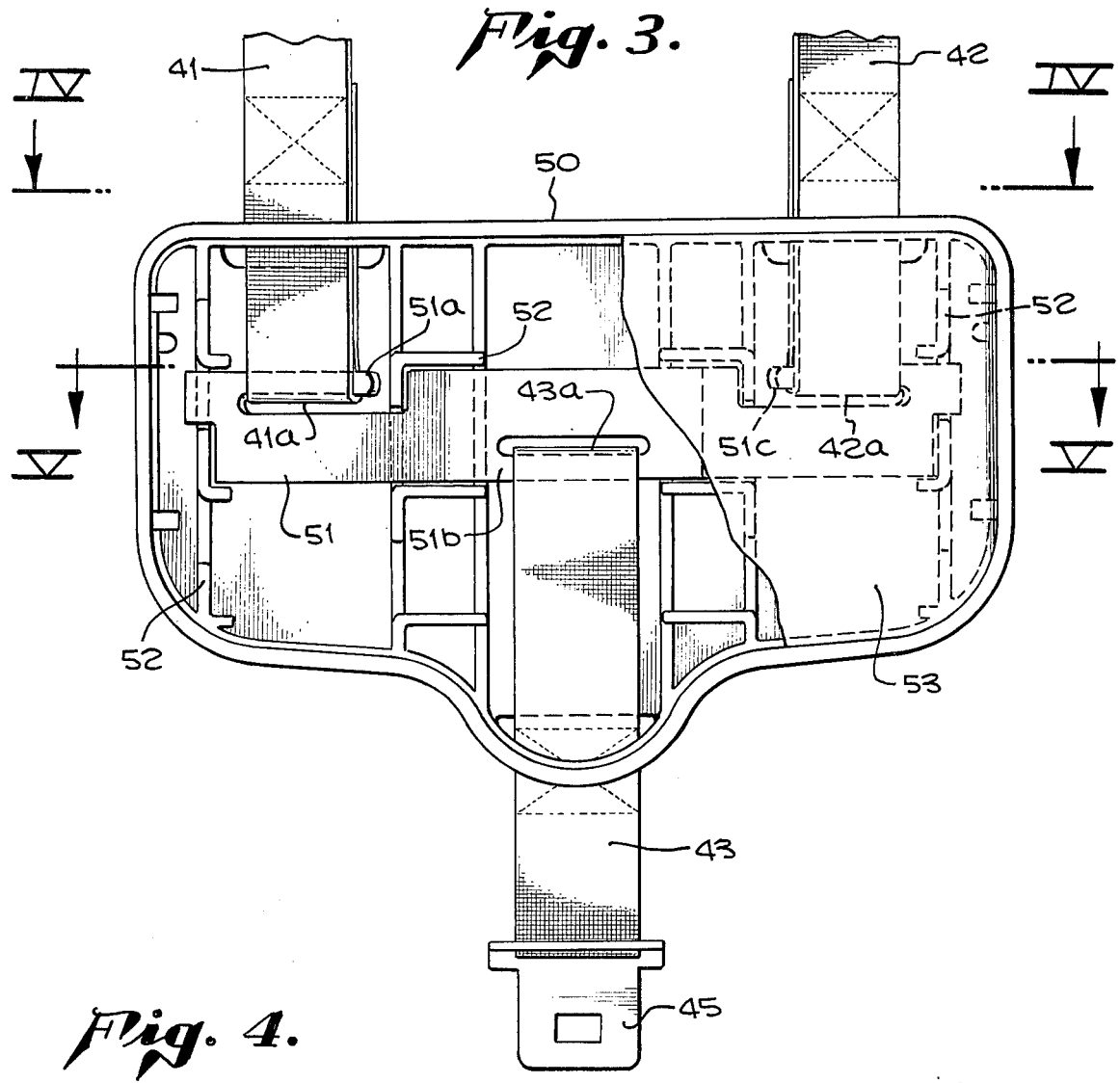
FIG. 3 is a front view, partially cut away, taken at the plane III—III in FIG. 2, and shows in detail the construction of the abdominal pad.
Figure 4:
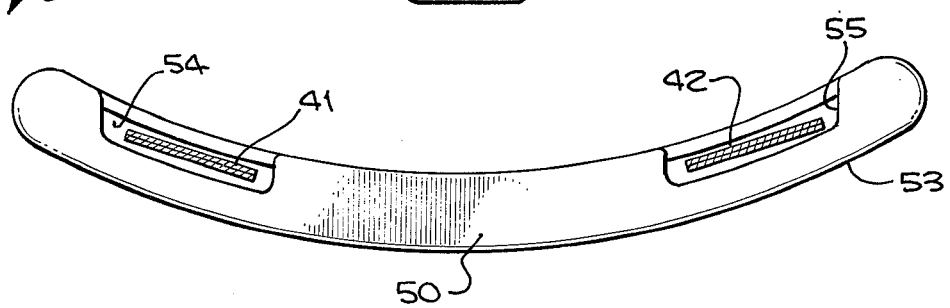
FIG. 4 is a top view of the abdominal pad and is taken through the plane IV—IV in FIG. 3.
Figure 5:
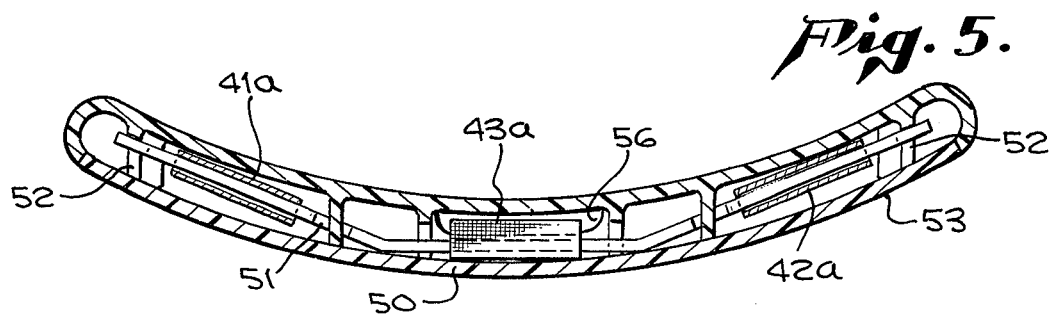
FIG. 5 is a sectional view of the abdominal pad taken through the plane V—V in FIG. 3.

The improvement of the present invention is used in conjunction with the child safety seat 10 is formed of one piece molded plastic and includes in the exemplary embodiment a pedestal section or base section 20 and a seating section 30. The child normally sits on the seating surface 31 with its back against the wall 34 and is supported against lateral movement by the sidewalls 32 and 33. Although not shown in the drawings, the seat would include a padding to cover the hard plastic material in places where the child would contact the seat. Normally, this padding is removable to facilitate cleaning of the padding and seat and means are provided although not shown to secure the padding to the seat. There are a number of slots through the walls of the child safety seat, and the padding would have slots aligned with the slots in the seat to allow passage of webbing therethrough.

The seat is secured in place by the conventional vehicle lap belt 3 which holds the seat against the conventional vehicle seat 2. Belt 3 exerts force on the load bearing surfaces 11 and 12 of sidewalls 33 and 32 respectively, and the load bearing surfaces are provided with a plurality of grooves to prevent lateral movement of the child safety seat.

A harness is provided for maintaining the child against the seat. In the exemplary embodiment, the harness 40 includes the upper harness webbing sections 41 and 42 which are connected to the abdominal pad 50 and anchored on the rear side of the seat in a manner discussed hereinafter. A lower harness webbing section or crotch strap 43 is also attached to the abdominal pad 50 at one of its ends and at the other end is attached to tongue plate 45 which mates with buckle 44 held in securing means 46 in the pedestal section 20 of the child safety seat. A slot 47 is provided in seating surface 31 to allow insertion of tongue plate 45 into buckle 44. The securing means 46 aligns buckle 44 with slot 47 so that insertion of tongue plate 45 in slot 47 buckles crotch strap 43 and therefore the entire harness means 40. This arrangement is discussed in detail in copending application Ser. No. 608,656, supra, incorporated by reference, herein.

The means for attaching the harness to the abdominal pad is also set forth in greater detail in that patent application. Briefly, the webbing sections 41, 42 and 43 all have loops 41a, 42a and 43a which receive sections 51a–51c of bar 51. The bar is mountable between adjacent ribs 52. By determining which ribs the bar is placed between the lengths of webbing protruding from the abdominal pad are controlled. The ribs and bar are covered by a snap-on cover 53, and the webbing protrudes from slots 54, 55 and 56 in the abdominal pad.

Although the adjustment in the position of the bar adjusts the lengths of all webbing protruding from the abdominal pad, this adjustment serves mainly to position the pad with respect to the crotch strap 43. While adjustment of the shoulder straps 41 and 42 is necessary as the size of the child is changed, the only reason straps 41 and 42 are adjusted at the pad is to accommodate the adjustment of crotch strap 43. This is also covered in more detail in patent application Ser. No. 608,656. The main adjustment of straps 41 and 42 is discussed below.

Figure 6:
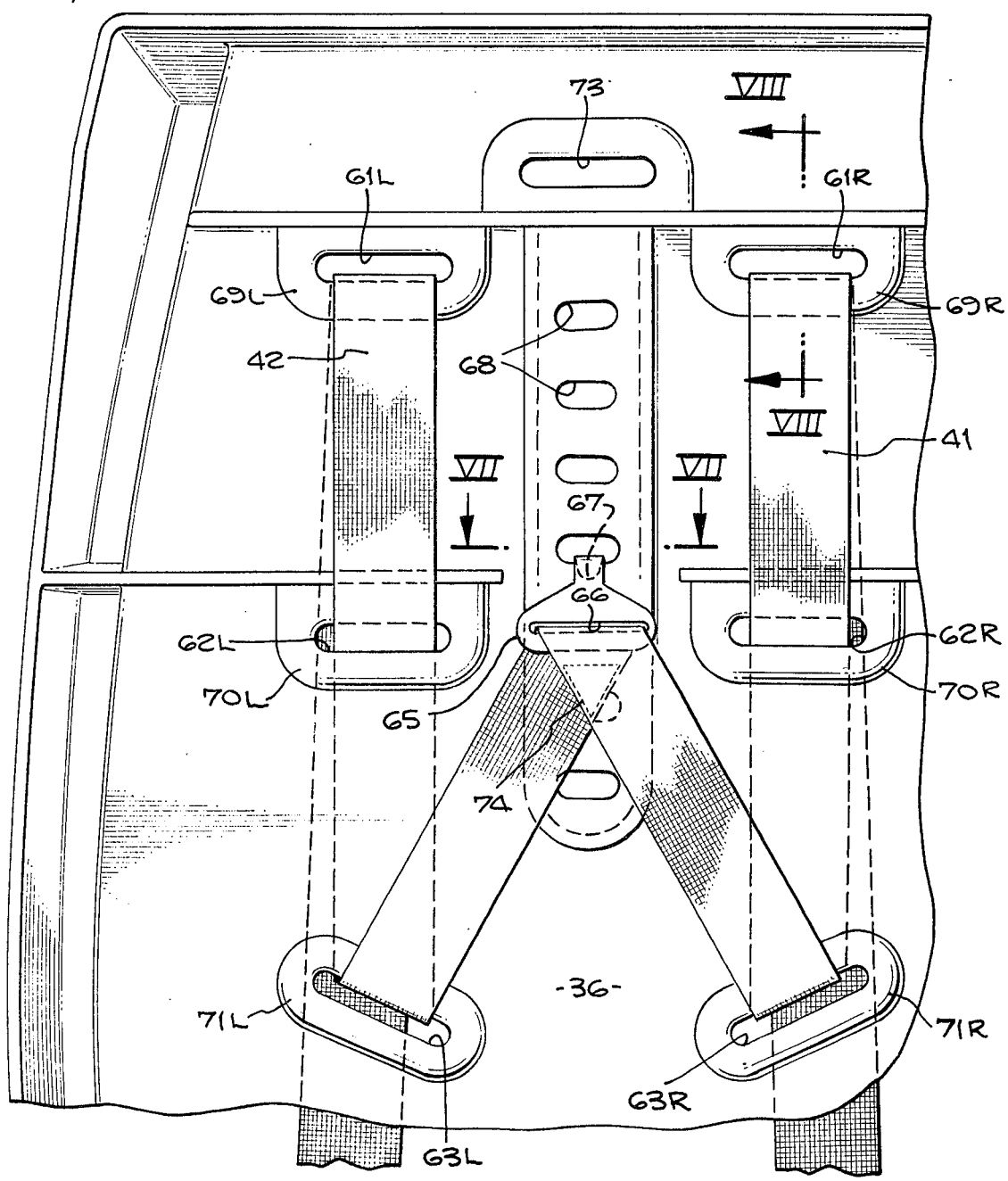
FIG. 6 is a partial rear view of the child safety seat taken through the plane VI—VI in FIG. 2, and shows the slots for passage of part of the harness from the front side to the rear side of the seat and the anchoring means on the rear side of the seat for anchoring the part of the harness at selected vertical locations on the rear side of the seat.

The present invention is concerned more with the anchoring and adjusting of the harness through the anchoring and adjusting of the upper harness portions 41 and 42. The adjusting and anchoring is shown with particular reference in the exemplary embodiment to FIGS. 2, 6, 7 and 8. For this discussion, the wall 34 which supports the child's back and head has a front side 35 and a rear side 36. Slot means are provided for passage of part of the harness from the front side to the rear side of the seat. In the exemplary embodiment, this is shown more clearly in FIGS. 6 and 8. With reference particularly to FIG. 2 in the exemplary embodiment, four sets of slots are shown, the letter L following the number indicates the left side of the child safety seat (FIG. 6) and the letter R indicating the right side. Only three sets of slots, 61 through 63 are shown in FIG. 6 but one of the fourth slots 64R is shown in FIG. 1 and slot 64L is shown in FIG. 2.

Referring again to FIG. 6, the child safety seat is adjusted for a larger, older infant. Straps 41 and 42 pass through the uppermost slots 61R, 61L and then are threaded back through slots 62R, 62L and then out again through slots 63R, 63L. Anchoring means on the rear side of the seat anchors the harness at selected vertical locations on the rear side of the seat. In the exemplary embodiment, the straps 41 and 42 which are threaded back through slots 63R and 63L meet at anchor plate 65. The straps may be sewn or otherwise connected to anchor plate 65, but in the preferred exemplary embodiment, straps 41 and 42 are in actuality one continuous strap that is held in slot 66 in anchor plate 65, and the strap is sewn together at 74. By passing the webbing through three slots, the load during a crash is distributed and friction at the slots absorbs some of the forces on the anchor or hook plate 65 and the opening 68.

The anchor plate which is attached to the harness includes a hook and the anchoring means includes a plurality of vertically spaced receiving means for receiving the hook at selected vertical positions for adjusting the harness. Again referring to FIG. 6 in the exemplary embodiment, anchor plate 65 includes a hook 67 which fits into any of a plurality of openings 68 on the rear of the seat. (FIGS. 2 and 6). It can readily be seen that by changing the receiving openings 68 through which hook 67 is placed, the amount of webbing on the front side of the child safety seat is controlled.

Around each slot 61 through 64, thickened portions 69R, L-73R, L are provided (FIGS. 2, 6, 8) for increased strength to resist damage to the seat during a crash and to provide slots 61–64 with more rounded edges to prevent scraping of the webbing sections 41 and 42. With reference again to FIG. 6, it is noted that slots 63R, L are at an angle to slots 61, 62. This is because in the exemplary embodiment, the receiving openings 68 are between the slots and angled slots 63 prevent the twisting of the webbing in the lower slots.

Means are provided in the receiving means for preventing insertion or removal of the hook means from the receiving means except when the hook means is in a particular insertion orientation with respect to the receiving means. It can be seen especially with reference to FIGS. 2 and 6 in the preferred embodiment that the hook 67 extends downward a distance greater than the height of receiving openings 68. Because of its angle with respect to anchor plate 65, hook 67 cannot be removed from receiving openings 68 by merely raising the hook upward and attempting to remove it from the opening. However, the width of hook 67 is less than the height of opening 68 so that if hook 67 is turned 90°, it can easily be removed from openings 68.

As stated above, the two webbing sections are formed of one continuous length of webbing, and the anchor plate or fitting 65 upon which hook 67 is mounted may be slidably mounted on the strap or, as shown in the exemplary embodiment, the webbing may be stitched at 74 near hook 67. The stitching keeps both ends of the webbing at equal lengths and makes it easier to handle the webbing and hook.

If a smaller child is seated in the seat, it is advantageous to have the straps pass through the seat wall nearer his shoulders to more effectively anchor him. Therefore, slots 62R and 62L would be used to pass the webbing from the front of the seat to the rear anchor. In that case, the webbing would generally be threaded back to the forward side of the seat through slots 73R, 73L and then back to the rear of the seat through slots 64R, 64L where again they are connected by means of hook 67 on anchor plate fitting 65 to the vertically spaced receiving openings 68.

Figure 7:
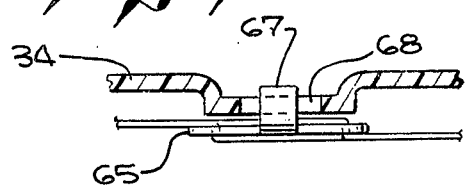
FIG. 7 is a sectional view taken through the plane VII—VII in FIG. 6 and shows in more detail the hook in a receiving opening in the anchoring means.
Figure 8:
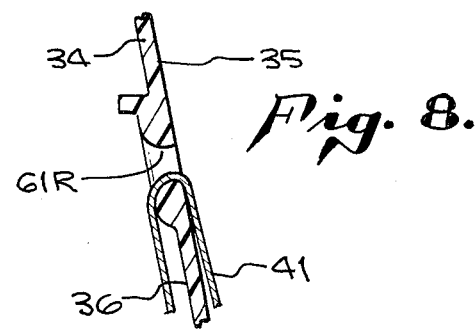
FIG. 8 is a sectional view taken through the plane VIII—VIII in FIG. 6 and shows detail in the slots.

Referring to FIG. 7, the portion of the wall 34 through which receiving openings 68 pass is set outwardly from the main portion of the rear surface 36 of wall 34. This prevents the hook 67 from interfering with the padding (not shown) on the front side of the seat.

Another slot 73 is also provided for an auxiliary strap is to be provided to anchor the top of the child safety seat to a remote location, usually in the rear of the vehicle. This auxiliary strap is important in preventing any tipping or rolling motion of the child safety seat during a crash.

It will be understood that various modifications and changes may be made in the configuration of the harness anchoring for a child safety seat described above which may come within the spirit of this invention and all such changes and modifications coming within the scope of the appended claims are embraced thereby.

We claim:

1. In a child safety seat having front and rear sides and a harness for maintaining a child against the front side, the improvement comprising the provision of:
   slot means for passage of part of said harness from the front side to the rear side of the seat; and anchoring means secured only to said seat on its rear side for providing a plurality of selectable independent anchoring locations on the seat for anchoring said part of the harness at selected vertical independent anchoring locations on the rear side of the seat.

2. The improvement of claim 1 further comprising the provision of:
   said harness means including a hook and said anchoring means including a plurality of vertically spaced receiving means for receiving said hook at selected vertical positions for adjusting the harness.

3. The improved anchoring means of claim 2 comprising:
   means in said receiving means for preventing insertion or removal of said hook means from said receiving means except when said hook means is in a particular insertion orientation with respect to the receiving means.

4. The improvement of claim 1 further comprising the provision of:
   said slot means including a plurality of pairs of vertically spaced slots, said harness passing through more than one slot of said pairs of slots between the front side and the anchoring means for better absorbing of energy by the seat from the harness during a crash.

5. The improved harness of claim 2 comprising:
   two webbing sections, one for each shoulder of the child, said webbing sections being formed of one continuous strip, said hook means being mounted on a fitting, and said fitting being slidably mounted on said webbing.

6. The improvement of claim 2 further comprising the provision of:
   said slot means including two rows of vertically spaced slots, said receiving means being located between said rows of slots, and said harness means including two webbing sections, each webbing section passing through at least one slot in each row of slots, a fitting between the webbing sections on the rear side of the child safety seat having the hook mounted thereon whereby said hook anchors both webbing sections to the rear of the seat.

7. The improvement of claim 6 further comprising the provision of:
   said webbing sections each passing through first slots at the same height on each row of slots, passing through second slots immediately below said first slots, and passing through third slots immediately below said second slots and connecting at said fitting for connection to the receiving means.

8. The improvement of claim 7 further comprising the provision of:
   said third slots being at an angle with respect to said second slots for angling said webbing sections toward the receiving means after they pass through said third slots.

9. In a child safety seat having front and rear sides and a harness for maintaining a child against the front side, the improvement comprising the provision of:
   slot means for passage of part of said harness from the front side to the rear side of the seat; anchoring means on the rear side of the seat for anchoring said part of the harness at selected vertical locations on the rear side of the seat; said harness means including a hook and said anchoring means including a plurality of vertically spaced receiving means for receiving said hook at selected vertical positions for adjusting the harness; said slot means including two rows of vertically spaced slots; said receiving means being located between said rows of slots; said harness means including two webbing sections, each webbing section passing through at least one slot in each row of slots; a fitting between the webbing sections on the rear side of the child safety seat having the hook mounted thereon whereby said hook anchors both webbing sections to the rear of the seat; said webbing sections each passing through first slots at the same height on each row of slots, passing through second slots immediately below said first slots, passing through third slots immediately below said second slots, and connecting at said fitting for connection to the receiving means.

10. The improvement of claim 9 further comprising the provision of:
    said third slots being at an angle with respect to said second slots for angling said webbing sections toward the receiving means after they pass through said third slots.

* * * * *